United States Patent
Matsukura et al.

(12)

(10) Patent No.: US 6,284,379 B1
(45) Date of Patent: Sep. 4, 2001

(54) FLUORINE-CONTAINING POLYMER COMPOSITION

(75) Inventors: Ikuo Matsukura; Naoko Shirota, both of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/662,863

(22) Filed: Sep. 15, 2000

Related U.S. Application Data

(62) Division of application No. 09/209,756, filed on Dec. 11, 1998, now Pat. No. 6,201,085.

(30) Foreign Application Priority Data

Dec. 18, 1997 (JP) .................................................... 9-349718

(51) Int. Cl.$^7$ ..................................................... B32B 27/00
(52) U.S. Cl. ......................... 428/421; 428/364; 428/412; 428/426; 428/457; 428/480; 526/242; 526/247; 526/248; 526/249; 526/251; 526/253

(58) Field of Search ..................................... 428/364, 412, 428/421, 426, 457, 480; 526/247, 242, 248, 249, 251, 253

(56) References Cited

U.S. PATENT DOCUMENTS

| 5,238,471 | 8/1993 | Blanchet-Fincher et al. . |
| 5,268,411 | 12/1993 | Yokotsuka et al. . |
| 5,498,657 | 3/1996 | Sugiyama et al. . |

FOREIGN PATENT DOCUMENTS

| 2-129254 | 5/1990 | (JP) . |
| WO 96/22356 | 7/1996 | (WO) . |

*Primary Examiner*—Helen L. Pezzuto
(74) *Attorney, Agent, or Firm*—Oblon, Spivak, McClelland, Maier & Neustadt, P.C.

(57) ABSTRACT

A fluorine-containing polymer composition comprising a fluorine-containing solvent of the formula $R^1$—O—$R^2$ wherein $R^1$ is a $C_{5-12}$ linear or branched polyfluoroalkyl group which may have an ether bond, and $R^2$ is a $C_{1-5}$ linear or branched alkyl group, and a fluorine-containing amorphous polymer having a fluorine-containing ring structure in its main chain, dissolved in the solvent.

19 Claims, No Drawings

FLUORINE-CONTAINING POLYMER COMPOSITION

This application is a Division of application Ser. No. 09/209,756 filed on Dec. 11, 1998, now U.S. Pat. No. 6,201,085.

The present invention relates to a fluorine-containing polymer composition comprising a specific fluorine-containing solvent and a fluorine-containing amorphous polymer having a fluorine-containing ring structure in its main chain, dissolved in the solvent.

Perfluoro polymers represented by a polytetrafluoroethylene, a tetrafluoroethylene/perfluoro (alkyl vinyl ether) copolymer and a tetrafluoroethylene/hexafluoropropylene copolymer, usually have excellent characteristics such that the heat resistance and chemical resistance are high, and the refractive index and the dielectric constant are small. However, these fluorine-containing polymers are usually insoluble in solvents.

WO96/22356 discloses that an amorphous tetrafluoroethylene copolymer is dissolved or dispersed in a solvent such as $C_5F_{11}OCH_3$, $C_5F_{11}OC_2H_5$ or $C_8F_{17}OCH_3$ to obtain a coating composition. However, there is no Example wherein an amorphous tetrafluoroethylene copolymer is actually dissolved in such a solvent, and it is uncertain whether or not an amorphous tetrafluoroethylene copolymer is in fact soluble in such a solvent.

Whereas, a fluorine-containing polymer having a fluorine-containing alicyclic structure in its main chain, as disclosed e.g. JP-B-8-22929, shows an amorphous nature, as the crystallization of the polymer is hindered by the steric effect of the ring structure. This fluorine-containing polymer is soluble in a specific perfluoro solvent such as perfluoro (2-butyltetrahydrofuran) even though it may be a perfluoro polymer. Accordingly, there is a merit in that from a perfluoro solvent solution of this fluorine-containing polymer, it is possible to form a thin film of the fluorine-containing polymer free from pinholes.

In recent years, with a view to global environmental protection, particularly to protection of the ozone layer, use of fluorochlorohydrocarbons has been banned, and from the viewpoint of warming up of the earth, use and discharge of carbon dioxide gas or perfluorohydrocarbons are desired to be restricted.

Especially perfluoro compounds such as perfluorohydrocarbons are said to substantially contribute to warming up of the earth because of their strong infrared ray absorbing abilities and their remarkably long lives in the atmosphere. For example, the estimated value for the life of perfluorohexane in the atmosphere is said to be from a few hundreds to a few thousands years. Such a perfluoro compound absorbs infrared rays over a long period of time and stores the radiation heat from the earth, whereby the influence over the warming up of the earth is believed to be substantial.

Under these circumstances, it is an object of the present invention to provide a fluorine-containing polymer composition having "a fluorine-containing amorphous polymer having a fluorine-containing ring structure in its main chain" (hereinafter referred to simply as a fluorine-containing ring structure-containing polymer) dissolved in a solvent which has a low contribution to warming up of the earth.

The present invention provides a fluorine-containing polymer composition comprising a fluorine-containing solvent of the formula $R^1$—O—$R^2$ wherein $R^1$ is a $C_{5-12}$ linear or branched polyfluoroalkyl group which may have an ether bond, and $R^2$ is a $C_{1-5}$ linear or branched alkyl group, and a fluorine-containing polymer having a fluorine-containing ring structure in its main chain, dissolved in the solvent.

In the present invention, the fluorine-containing solvent is a fluorine-containing solvent of the formula $R^1$—O—$R_2$ wherein $R^1$ is a $C_{5-12}$ linear or branched polyfluoroalkyl group which may have an ether bond, and $R^2$ is a $C_{1-5}$ linear or branched alkyl group.

If the carbon number of $R^1$ is 4 or less, it tends to be difficult to dissolve the fluorine-containing ring structure-containing polymer, and if the carbon number of $R^1$ is 13 or higher, such a solvent is hardly industrially available. Accordingly, the carbon number of $R^1$ is selected within a range of from 5 to 12. The carbon number of $R^1$ is preferably from 6 to 10, more preferably from 6 to 7 or 9 to 10.

The polyfluoroalkyl group is a group having at least two hydrogen atoms of an alkyl group substituted by fluorine atoms, and it includes a perfluoroalkyl group having all hydrogen atoms of an alkyl group substituted by fluorine atoms, and a group having at least two hydrogen atoms of an alkyl group substituted by fluorine atoms and having at least one hydrogen atom of the alkyl group substituted by a halogen atom other than a fluorine atom. As the halogen atom other than a fluorine atom, a chlorine atom is preferred.

The polyfluoroalkyl group is preferably a group having at least 60% in the number of hydrogen atoms of the corresponding alkyl group substituted by fluorine atoms, more preferably a group having at least 80% so substituted. A more preferred polyfluoroalkyl group is a perfluoroalkyl group.

When $R^1$ has an ether bond, the number of ether bonds in $R^1$ is usually from 1 to 3, more preferably 1 or 2, since if the number of ether bonds is too much, the solubility will be impaired.

If the carbon number of $R^2$ is 6 or higher, the solubility of the fluorine-containing ring structure-containing polymer will be substantially impaired. A preferred example of $R^2$ is $CH_3$ or $C_2H_5$.

The molecular weight of the fluorine-containing solvent is preferably at most 1,000, since if it is too large, not only the viscosity of the fluorine-containing polymer composition increases, but also the solubility of the fluorine-containing ring structure-containing polymer decreases. Further, in order to increase the solubility of the fluorine-containing ring structure-containing polymer, the fluorine content of the fluorine-containing solvent is preferably from 60 to 80 wt %.

The following may, for example, be mentioned as preferred fluorine-containing solvents.

$F(CF_2)_5OCH_3$,
$F(CF_2)_6OCH_3$,
$F(CF_2)_7OCH_3$,
$F(CF_2)_8OCH_3$,
$F(CF_2)_9OCH_3$,
$F(CF_2)_{10}CH_3$,
$H(CF_2)_6OCH_3$,
$(CF_3)_2CF(OCH_3)CFCF_2CF_3$,
$F(CF_2)_3OCF(CF_3)CF_2OCH_3$,
$F(CF_2)_3OCF(CF_3)CF_2OCF(CF_3)CF_2OCH_3$,
$F(CF_2)_8OCH_2CH_2CH_3$,
$(CF_3)_2CFCF_2CF_2OCH_3$,
$F(CF_2)_2O(CF_2)_4OCH_2CH_3$.

As an example, the estimated life in the atmosphere of the fluorine-containing solvent in the present invention is from about 1 to 5 years in the case of $F(CF_2)_5OCH_3$ and $F(CF_2)OCH_2CH_3$. As the fluorine-containing solvent in the present invention, $F(CF_2)_6OCH_3$, $F(CF_2)_7OCH_3$, $F(CF_2)_8OCH_3$, $F(CF_2)_9OCH_3$ and $F(CF_2)_{10}OCH_3$ are preferred, $F(CF_2)_6OCH_3$, $F(CF_2)_7OCH_3$, $F(CF_2)_9OCH_3$ and $F(CF_2)_{10}OCH_3$ are particularly preferred.

Such fluorine-containing solvents may be suitably used in combination as a mixture of two or more of them. In a case of a solvent mixture of a fluorine-containing solvent with other solvent, such other solvent may be a solvent which is by itself incapable of dissolving the fluorine-containing ring structure-containing polymer.

As such other solvents, fluorine-containing ethers other than the fluorine-containing solvent in the present invention, such as $F(CF_2)_4OCH_3$ and $F(CF_2)_4OC_2H_5$, hydrocarbons such as hexane, hydrochlorocarbons such as chloroform, hydrochlorofluorocarbons such as dichloropentafluoropropane, fluorine-containing aromatic hydrocarbons such as m-xylene hexafluoride and benzotrifluoride, and alcohols such as methanol, ethanol, (perfluorohexyl)ethanol and pentafluoropropanol, may, for example, be used in combination. The blend ratio of such other solvents is suitably selected depending upon the concentration of the fluorine-containing ring structure-containing polymer, but is preferably from 0.1 to 50 parts by weight, m ore preferably from 1 to 30 parts by weight, per 100 parts by weight of the fluorine-containing solvent.

In the present invention, the fluorine-containing ring structure-containing polymer may, for example, be a fluorine-containing polymer having a fluorine-containing alicyclic structure (including a fluorine-containing imide ring structure), a fluorine-containing triazine ring structure or a fluorine-containing aromatic ring structure in its main chain. Among them, a fluorine-containing polymer having a fluorine-containing alicyclic structure in its main chain is preferred, and particularly preferred is one having a fluorine-containing aliphatic ether ring structure in its main chain.

The term "having a fluorine-containing ring structure in its main chain" is meant for having a structure wherein at least one carbon atom constituting the ring is a carbon atom in the carbon chain constituting the main chain and a fluorine atom or a fluorine-containing group is bonded to at least a part of carbon atoms constituting the ring.

The fluorine-containing polymer having a fluorine-containing alicyclic structure in its main chain is preferably one obtained by polymerizing a monomer having a fluorine-containing ring structure or a polymer having a fluorine-containing alicyclic structure in its main chain, obtained by cyclic polymerization of a fluorine-containing monomer having at least two polymerizable double bonds.

The polymer having a fluorine-containing alicyclic structure in its main chain, obtained by polymerizing a monomer having a fluorine-containing ring structure, is known, for example, by JP-B-63-18964. Namely, the polymer having a fluorine-containing alicyclic structure in its main chain, can be obtained by homopolymerization of a monomer having a fluorine-containing ring structure such as perfluoro(2,2-dimethyl-1,3-dioxole), or by copolymerizing such a monomer with a radical polymerizable monomer having no fluorine-containing ring structure, such as tetrafluoroethylene, chlorotrifluoroethylene or perfluoro (methyl vinyl ether). Whereas, the polymer having a fluorine-containing alicyclic structure in its main chain, obtained by cyclic polymerization of a fluorine-containing monomer having at least two polymerizable double bonds, is known, for example, by JP-A-63-238111 or JP-A-63-238115. Namely, the polymer having a fluorine-containing alicyclic structure in its main chain can be obtained by cyclic polymerization of a fluorine-containing monomer having at least two polymerizable double bonds and being cyclopolymerizable, such as perfluoro(allyl vinyl ether) or perfluoro(butenyl vinyl ether), or by copolymerizing such a monomer with a radical polymerizable monomer which is not cyclopolymerizable, such as tetrafluoroethylene, chlorotrifluoroethylene or perfluoro(methyl vinyl ether).

Further, the polymer having a fluorine-containing alicyclic structure in its main chain can be obtained also by copolymerizing a monomer having a fluorine-containing ring structure such as perfluoro(2,2-dimethyl-1,3-dioxole) with a fluorine-containing monomer having at least two polymerizable double bonds and being cyclopolymerizable, such as perfluoro(allyl vinyl ether) or perfluoro(butenyl vinyl ether).

The polymer having a fluorine-containing alicyclic structure in its main chain is preferably one containing at least 20 mol %, preferably at least 40 mol %, of polymer units having a fluorine-containing alicyclic structure in its main chain, based on the total polymer units of the polymer having a fluorine-containing alicyclic structure in its main chain, from the viewpoint of transparency or mechanical properties.

Specifically, one having repeating units selected from the following formulae (1) to (4), is preferred as such a polymer having a fluorine-containing alicyclic structure in its main chain. Fluorine atoms in such a polymer having a fluorine-containing alicyclic structure in its main chain may partly be substituted by chlorine atoms.

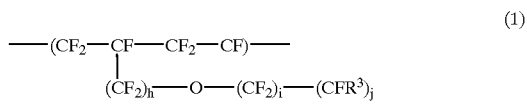

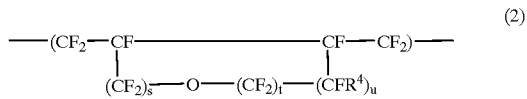

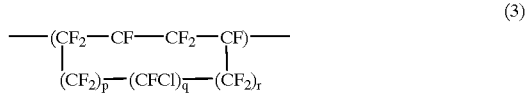

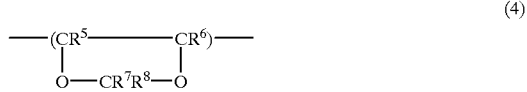

In the formulae (1) to (4), h is an integer of from 0 to 5, i is an integer of from 0 to 4, j is 0 or 1, h+i+j is an integer of from 1 to 6, s is an integer of from 0 to 5, t is an integer of from 0 to 4, u is 0 or 1, s+t+u is an integer of from 1 to 6, each of p, q and r which are independent of one another, is an integer of from 0 to 5, p+q+r is an integer of from 1 to 6, and each of $R^3$ to $R^8$ which are independent of one another, is F, Cl, D (deuterium) or $CF_3$.

In the present invention, the monomer having a fluorine-containing ring structure is preferably a monomer selected from compounds of the following formulae (5) to (7):

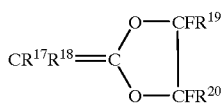
(7)

In the formulae (5) to (7), each of $R^9$ to $R^{20}$ which are independent of one another, is F, Cl, D or $CF_3$, provided that $R^{11}$ and $R^{12}$, $R^{15}$ and $R^{16}$, or $R^{19}$ and $R^{20}$, may be connected to form a ring.

As specific examples of the compounds of the formulae (5) to (7), compounds of the formulae (11) to (18) may, for example, be mentioned.

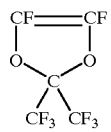
(11)

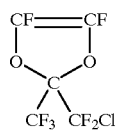
(12)

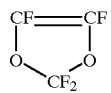
(13)

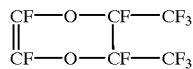
(14)

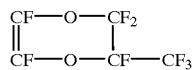
(15)

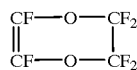
(16)

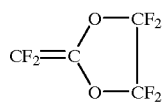
(17)

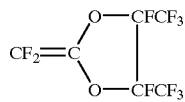
(18)

As the fluorine-containing monomer having at least two polymerizable double bonds, compounds of the following formulae (8) to (10) are preferred.

$$CY^1Y^2\!=\!CY^3OCY^4Y^5CY^6Y^7CY^8\!=\!CY^9Y^{10} \quad (8)$$

$$CZ^1Z^2\!=\!CZ^3OCZ^4Z^5CZ^6\!=\!CZ^7Z^8 \quad (9)$$

$$CW^1W^2\!=\!CW^3OCW^4W^5OCW^6\!=\!CW^7W^8 \quad (10)$$

In the formulae (8) to (10), each of $Y^1$ to $Y^{10}$, $Z^1$ to $Z^8$ and $W^1$ to $W^8$ which are independent of one another, is F, Cl, D or $CF_3$.

As specific examples of the compounds of the formulae (8) to (10), the following compounds may be mentioned:

$CF_2\!=\!CFOCF_2CF_2CF\!=\!CF_2$,
$CF_2\!=\!CFOCD_2CF_2CF\!=\!CF_2$,
$CF_2\!=\!CFOCCl_2CF_2CF\!=\!CF_2$,
$CF_2\!=\!CFOCF_2CF_2CD\!=\!CF_2$,
$CF_2\!=\!CFOCF_2CF_2CCl\!=\!CF_2$,
$CF_2\!=\!CFOCF_2CFDCF\!=\!CF_2$,
$CF_2\!=\!CFOCF_2CFClCF\!=\!CF_2$,
$CF_2\!=\!CFOCF_2CF_2CF\!=\!CFCl$,
$CF_2\!=\!CFOCF_2CF(CF_3)CF\!=\!CF_2$,
$CF_2\!=\!CFOCF_2CF(CF_3)CD\!=\!CF_2$,
$CF_2\!=\!CFOCF_2CF(CF_3)CCl\!=\!CF_2$,
$CF_2\!=\!CFOCF_2CF\!=\!CF_2$,
$CF_2\!=\!CFOCF(CF_3)CF\!=\!CF_2$,
$CF_2\!=\!CFOCF_2OCF\!=\!CF_2$,
$CF_2\!=\!CDOCF_2OCD\!=\!CF_2$,
$CF_2\!=\!CClOCF_2OCCl\!=\!CF_2$,
$CF_2\!=\!CFOCD_2OCF\!=\!CF_2$,
$CF_2\!=\!CFOCCl_2OCF\!=\!CF_2$,
$CF_2\!=\!CFOC(CF_3)_2OCF\!=\!CF_2$,

The concentration of the fluorine-containing polymer in the fluorine-containing polymer composition of the present invention is preferably from 0.01 to 50 wt %, more preferably from 0.1 to 20 wt %.

A thin film of the fluorine-containing ring structure-containing polymer can be formed on a substrate by coating on the substrate the fluorine-containing polymer composition of the present invention having the fluorine-containing ring structure-containing polymer dissolved in the fluorine-containing solvent and then drying the fluorine-containing solvent. The thickness of the thin film is selected usually within a range of from 0.01 to 50 μm. The thin film may be applied to a substrate of any shape or of any material. When the thin film is an antireflection film, the substrate is preferably polymethyl methacrylate, polycarbonate, polyethylene terephthalate or the like. The temperature for drying the fluorine-containing solvent is optionally selected depending upon the heat resistance of the substrate, but it is usually preferably from 50 to 150° C., more preferably from 70 to 120° C. To prevent an irregular film thickness, it is preferred to form the thin film in an antistatic atmosphere.

A thin film of the fluorine-containing ring structure-containing polymer can be obtained by coating on a substrate the fluorine-containing polymer composition of the present invention having the fluorine-containing ring structure-containing polymer dissolved in the fluorine-containing solvent, then drying the fluorine-containing solvent to form a thin film of the fluorine-containing ring structure-containing polymer on the substrate, and then peeling the thin film of the fluorine-containing ring structure-containing polymer from the substrate. The thickness of the thin film is selected usually within a range of from 0.01 to 50 μm. As the substrate, glass is preferred, since the heat resistance temperature is high, and the thin film can easily be peeled from the substrate. The temperature for drying the fluorine-containing solvent is optionally selected depending upon the heat resistance of the substrate, but it is preferably at least the boiling point of the fluorine-containing solvent. The temperature for drying is preferably from 50 to 200° C., more preferably from 70 to 150° C. To prevent an irregular film thickness, it is preferred to form the thin film in an antistatic atmosphere. Peeling of the thin film from the substrate is preferably carried out in a polar solvent which does not dissolve the fluorine-containing ring structure-containing polymer, particularly preferably in water.

When a thin film having a thickness of at most 0.1 μm is to be formed, the above-mentioned fluorine-containing solvent of the formula $R^1$—O—$R^2$ is preferably one wherein $R^1$ is a $C_{6-7}$ polyfluoroalkyl group, since a uniform thin film with little thickness deviation can be obtained.

When a thin film having a thickness of at least 1 μm is to be formed, the above-mentioned fluorine-containing solvent of the formula $R^1$—O—$R^2$ is preferably one wherein $R^1$ is a $C_{9-12}$ polyfluoroalkyl group, since a uniform thin film with little thickness deviation can be obtained.

As a method for forming the thin film, a roll coating method, a casting method, a dipping method, a spin coating method, a casting on water method, a die coating method or Langmuir Blodgett method may, for example, be mentioned.

In order to improve the adhesion of the fluorine-containing polymer to the substrate, a coupling agent of e.g. silane type, epoxy type, titanium type or aluminum type may be incorporated together with a fluorine-containing alcohol to the fluorine-containing polymer composition, or an oligomer or the like, of a silane coupling agent, may be incorporated.

The obtained thin film may be used as it is adhered to the substrate or after peeling it from the substrate. As an application of the thin film, a protective coat in the optical field or in the electrical field may be mentioned. In such a case, as the substrate, a magnetic disc substrate, an optical fiber, a mirror, a solar cell, an optical disc, a touch panel, a photosensitive and fixing drum, a film capacitor or various films for glass windows, may, for example, be mentioned.

Further, the thin film can be used for a coating type photoconductive material, a coating material of electric wires, an ink repellent (for example for coating, or for a printing equipment such as an ink jet printer), a lens material, an adhesive for semiconductor elements (for example, an adhesive for a LOC (lead on chip) tape, an adhesive for a diebond or an adhesive for fixing a pellicle film), a protective coat for semiconductors (for example, a buffer coat film, a passivation film, an α-ray shielding film for semiconductor elements or a moisture preventive coating agent), an interlayer dielectrics (for example, for semiconductor elements, for liquid crystal display devices or for multilayered circuit boards), an optical thin film (a pellicle film (for KrF excimer laser or ArF excimer laser), an antireflection film for display devices or an antireflection film for resists).

By using the fluorine-containing polymer composition of the present invention, a thin film can be formed without impairing the characteristics of the fluorine-containing ring structure-containing polymer, such that it is free from defects such as pinholes and it is transparent with low refractive index and excellent in heat resistance and chemical resistance.

Now, the present invention will be described in further detail with reference to Examples. However, it should be understood that the present invention is by no means restricted to such specific Examples.

EXAMPLE 1

Preparation of a Fluorine-containing Ring Structure-containing Polymer 35 g of perfluoro(butenyl vinyl ether), 150 g of deionized water, 6 g of methanol as a molecular weight regulating agent and 90 mg of $((CH_3)_2CHOCOO)_2$ as a polymerization initiator, were introduced into a pressure resistant glass autoclave having an internal capacity of 200 ml. The interior of the system was replaced three times with nitrogen, and then suspension polymerization was carried out at 40° C. for 22 hours to obtain an amorphous polymer having terminal groups attributable to the initiator. This polymer was subjected to heat treatment in air at 320° C. for 60 minutes, then washed with water and dried. As a result, a fluorine-containing ring structure-containing polymer having the above-mentioned terminal groups converted to carboxyl groups (hereinafter referred to as polymer A) was obtained in an amount of 33 g.

From the infrared spectrum analysis of polymer A, absorption peaks attributable to carboxyl groups were confirmed at 1,811 $cm^{-1}$ and 1,773 $cm^{-1}$. The specific viscosity [η] of polymer A was 0.35 at 30° C. in perfluoro(2-butyltetrahydrofuran). The glass transition temperature of polymer A was 108° C., and it was a polymer which was tough, transparent and glassy at room temperature. Further, the 10% thermal decomposition temperature was 465° C., and the light transmittance was as high as at least 95%.

EXAMPLE 2

Preparation of a Fluorine-containing Ring Structure-containing Polymer 35 g of perfluoro(butenyl vinyl ether), 150 g of deionized water, 6 g of methanol as a molecular weight regulating agent and 90 mg of $((CH_3)_2CHOCOO)_2$ as a polymerization initiator, were introduced into a pressure resistant glass autoclave having an internal capacity of 200 ml. The interior of the system was replaced three times with nitrogen, and then suspension polymerization was carried out at 40° C. for 22 hours to obtain 28 g of a fluorine-containing ring structure-containing polymer (hereinafter referred to as polymer B).

The specific viscosity [η] of polymer B was 0.35 at 30° C. in perfluoro(2-butyltetrahydrofuran). The glass transition point of polymer B was 108° C., and it was a polymer which was tough, transparent and amorphous at room temperature. Further, the 10% thermal decomposition temperature was 465° C. The light transmittance was as high as at least 95%, and the refractive index was as low as 1.34.

EXAMPLE 3

Comparative Example 1 g of polymer A and 99 g of $F(CF_2)_3OCH_3$ were put into a glass flask and stirred under heating at 30° C. for 24 hours. As a result, polymer A was not dissolved although it swelled.

EXAMPLE 4

Comparative Example 1 g of polymer A and 99 g of $F(CF_2)_4OCH_3$ were put into a glass flask and stirred under heating at 40° C. for 24 hours. As a result, polymer A was partially dissolved, but was not completely dissolved, and swelled polymer A remained.

EXAMPLE 5

Present Invention 1 g of polymer A and 99 g of $F(CF_2)_6OCH_3$ were put into a glass flask and stirred under heating at 40° C. for 24 hours. As a result, a colorless transparent uniform solution free from turbidity was obtained. Using this solution, a polymethylacrylate plate having an average reflectance of 4% on one side was subjected to dip coating at a withdrawing speed of 200 mm/min and then subjected to heat treatment at 80° C. for 1 hour, whereby a uniform transparent film of 0.1 μm was obtained on the acrylic plate. The film thickness deviation of this film was less than 1%. The average reflectance on one side of this polymethylacrylate plate was 1.0%. This polymethylacrylate plate can be used as a low reflection filter.

EXAMPLE 6

Present Invention 1 g of polymer A and 99 g of $F(CF_2)_8OCH_3$ were put into a glass flask and stirred under heating at 40° C. for 24 hours. As a result, a colorless transparent uniform solution free from turbidity was obtained. By using this solution, a polymethylacrylate plate having an average reflectance of 4% on one side was subjected to dip coating at a withdrawing speed of 200 mm/min and then subjected to heat treatment at 80° C. for 1 hour, whereby a transparent film of 0.1 μm was obtained on the polymethylacrylate plate. The film thickness deviation of this film was 5%. The average reflectance on one side of this polymethylacrylate plate was 1.0%.

EXAMPLE 7

Present Invention 9 g of polymer B and 91 g of $F(CF_2)_{10}OCH_3$ were put into a glass flask and stirred under heating at 50° C. for 24 hours. As a result, a colorless transparent uniform solution free from turbidity was obtained. Using this solution, spin coating was carried out on a glass plate at a spinning speed of 700 rpm for 30 seconds and then subjected to heat treatment at 80° C. for 1 hour and then at 180° C. for further 1 hour, whereby a uniform transparent film was obtained on the glass plate. Thereafter, an aluminum frame having an adhesive coated, was bonded to the film, and this film was peeled from the glass plate, whereby an aluminum frame provided with a self-standing film of uniform polymer B having a film thickness of 1 μm was obtained. The film thickness deviation of this film was less than 1%. This frame can be used as a pellicle.

EXAMPLE 8

Present Invention 9 g of polymer B and 91 g of $F(CF_2)_8OCH_3$ were put into a glass flask and stirred under heating at 50° C. for 24 hours. As a result, a colorless transparent uniform solution free from turbidity was obtained. Using this solution, spin coating was carried out on a glass plate at a spinning speed of 700 rpm for 30 seconds, and then heat treatment was carried out at 80° C. for 1 hour and at 180° C. for further 1 hour, whereby a uniform transparent film was obtained on the glass plate. The film thickness deviation of this film was 6%.

EXAMPLE 9

Present Invention

Using the solution of polymer A obtained in Example 7, spin coating was carried out on a metal substrate at a spinning speed of 700 rpm for 30 seconds, and then heat treatment was carried out at 80° C. for 1 hour and at 180° C. for further 1 hour, whereby a uniform transparent film of 1 μm was obtained on the metal plate. This film was free from pinholes, which was confirmed by the fact that the electric resistance of this thin film was at least $10^{15}$ Ωcm.

EXAMPLE 10

Present Invention

A polymethylacrylate plate having a uniform thin film of 0.1 μm was obtained in the same manner as in Example 5 except that instead of polymer B, 9 g of a perfluoro(2,2-dimethyl-1,3-dioxolane)/tetrafluoroethylene (65 mol %/35 mol %) amorphous copolymer (Teflon AF1600, tradename, manufactured by Du Pont) was used, and instead of $F(CF_2)_6OCH_3$, 91 g of $(CF_3)_2CF(OCH_3)CFCF_2CF_3$ was used. The film thickness deviation of this film was less than 1%. The average reflectance on one side of this polymethylacrylate plate was 1.0%.

According to the present invention, the fluorine-containing ring structure-containing polymer can be dissolved by means of a solvent which is little influential over the global environment, particularly over warming up of the earth, and a thin film of the fluorine-containing ring-structure-containing polymer can be formed while suppressing the adverse effects to the global environment.

What is claimed is:

1. A process for forming a thin film of a fluorine-containing amorphous polymer on a substrate, which comprises coating on the substrate a fluorine-containing polymer composition comprising a fluorine-containing solvent of the formula $R^1$—O—$R^2$ wherein $R^1$ is a $C_{5-12}$ linear or branched polyfluoroalkyl group which may have an ether bond, and $R^2$ is a $C_{1-5}$ linear or branched alkyl group, and a fluorine-containing amorphous polymer having a fluorine-containing ring structure in its main chain, dissolved in the solvent, and then drying the fluorine-containing solvent, wherein the polyfluoroalkyl group is a group having at least 80% of the number of hydrogen atoms of the corresponding alkyl group substituted by fluorine atoms.

2. The process according to claim 1, wherein the fluorine-containing ring structure is a fluorine-containing alicyclic structure, a fluorine-containing triazine ring structure or a fluorine-containing aromatic ring structure.

3. The process according to claim 1, wherein the fluorine-containing alicyclic structure is a fluorine-containing aliphatic ether ring structure.

4. The process according to claim 1, wherein the thin film is an antireflection film.

5. A process for forming a thin film of a fluorine-containing amorphous polymer on a substrate, which comprises coating on the substrate a fluorine-containing polymer composition comprising a fluorine-containing solvent of the formula $R^1$—O—$R^2$ wherein $R^1$ is a $C_{5-12}$ linear or branched polyfluoroalkyl group which may have an ether bond, and $R^2$ is a $C_{1-5}$ linear or branched alkyl group, and a fluorine-containing amorphous polymer having a fluorine-containing ring structure in its main chain, dissolved in the solvent, and then drying the fluorine-containing solvent to form a thin film of the fluorine-containing amorphous polymer on the substrate, and then peeling the thin film of the fluorine-containing amorphous polymer from the substrate, wherein the polyfluoroalkyl group is a group having at least 80% of the number of hydrogen atoms of the corresponding alkyl group substituted by fluorine atoms.

6. The process according to claim 5, wherein the fluorine-containing ring structure is a fluorine-containing alicyclic structure, a fluorine-containing triazine ring structure or a fluorine-containing aromatic ring structure.

7. The process according to claim 5, wherein the fluorine-containing alicyclic structure is a fluorine-containing aliphatic ether ring structure.

8. The process according to claim 5, wherein the thin film is a pellicle film.

9. A process for forming a thin film of a fluorine-containing amorphous polymer on a substrate, which comprises coating on the substrate a fluorine-containing polymer composition comprising a fluorine-containing solvent selected from the group consisting of $F(CF_2)_6OCH_3$, $F(CF_2)_7OCH_3$, $F(CF_2)_8OCH_3$, $F(CF_2)_9OCH_3$ and $F(CF_2)_{10}OCH_3$, and mixtures thereof, and a fluorine-containing amorphous polymer having a fluorine-containing ring structure in its main chain, dissolved in the solvent, and then drying the fluorine-containing solvent.

10. The process according to claim 9, wherein the fluorine-containing ring structure is a fluorine containing alicyclic structure, a fluorine-containing triazine ring structure or a fluorine-containing aromatic ring structure.

11. The process according to claim 9, wherein the fluorine-containing alicyclic structure is a fluorine containing aliphatic ether ring structure.

12. The process according to claim 9, wherein the thin film is an antireflection film.

13. A process for forming a thin film of a fluorine-containing amorphous polymer on a substrate, which comprises coating on the substrate a fluorine-containing polymer composition comprising a fluorine-containing solvent selected from the group consisting of $F(CF_2)_6OCH_3$, $F(CF_2)_7OCH_3$, $F(CF_2)_8OCH_3$, $F(CF_2)_9OCH_3$ and $F(CH_2)_{10}OCH_3$, and mixtures thereof, and a fluorine-containing amorphous polymer having a fluorine-containing ring structure in its main chain, dissolved in the solvent, and then drying the fluorine-containing solvent to form a thin film of the fluorine-containing amorphous polymer on the substrate, and then peeling the thin film of the fluorine-containing amorphous polymer from the substrate.

14. The process according to claim 13, wherein the fluorine-containing ring structure is a fluorine containing alicyclic structure, a fluorine-containing triazine ring structure or a fluorine-containing aromatic ring structure.

15. The process according to claim 13, wherein the fluorine-containing alicyclic structure is a fluorine containing aliphatic ether ring structure.

16. The process according to claim 13, wherein the thin film is a pellicle film.

17. A process for forming a thin film of a fluorine-containing amorphous polymer on a substrate, which comprises coating on the substrate a fluorine-containing polymer composition comprising a fluorine-containing solvent of the formula $R^1-O-R^2$ wherein $R^1$ is a $C_{5-12}$ linear or branched perfluoroalkyl group which may have an ether bond, and $R^2$ is a $C_{1-5}$ linear or branched alkyl group, and a fluorine-containing amorphous polymer having a fluorine-containing ring structure in its main chain, dissolved in the solvent, and then drying the fluorine-containing solvent.

18. The process according to claim 17, wherein the fluorine-containing ring structure is a fluorine containing alicyclic structure, a fluorine-containing triazine ring structure or a fluorine-containing aromatic ring structure.

19. The process according to claim 17, wherein the fluorine-containing alicyclic structure is a fluorine containing aliphatic ether ring structure.

* * * * *